June 12, 1934.  G. G. LANDIS  1,962,691
DYNAMO ELECTRIC MACHINE
Filed May 9, 1931
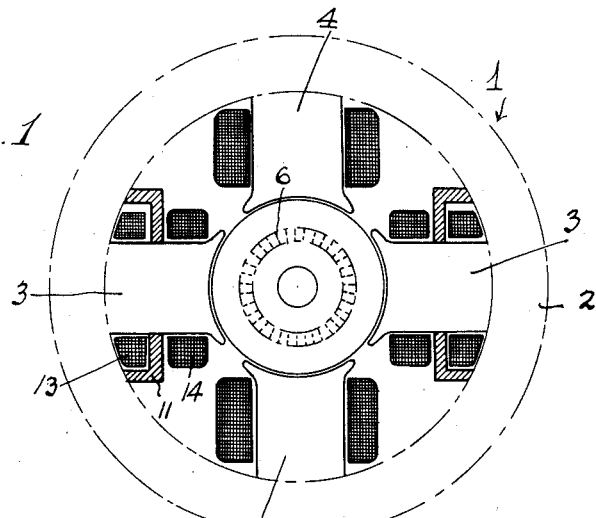
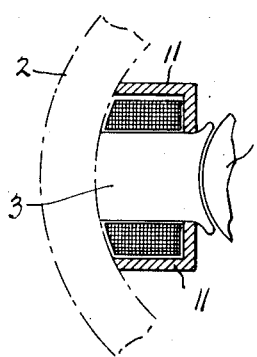
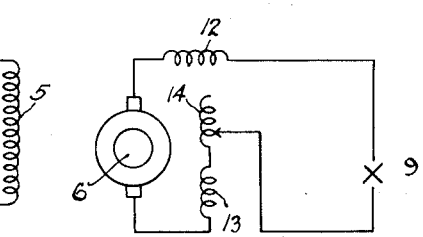
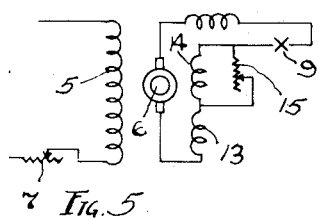
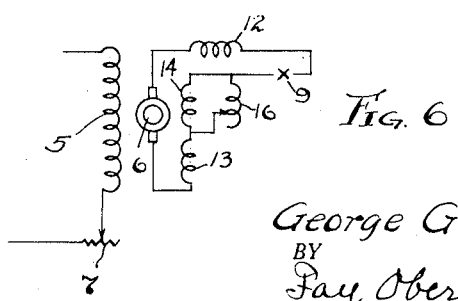
INVENTOR.
George G. Landis
BY
Fay, Oberlin & Fay
ATTORNEYS.

Patented June 12, 1934

1,962,691

UNITED STATES PATENT OFFICE 1,962,691

DYNAMO ELECTRIC MACHINE

George G. Landis, Cleveland, Ohio, assignor to The Lincoln Electric Company, Cleveland, Ohio, a corporation of Ohio Application May 9, 1931, Serial No. 536,183

6 Claims. (Cl. 171—223)

This invention, relating as indicated to dynamo electric machines, has specific reference to a form of such machines designed to be employed as a generator for the welding current in a welding circuit.

It is among the objects of this invention to provide a form of construction for a welding current generator which will permit the omission of the usual separate stabilizing inductance in the circuit without a sacrifice of any efficiency in the operation of the welding arc and the enjoyment of further advantages which will appear as the description proceeds.

To the accomplishment of the foregoing and related ends, said invention, then consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a transverse sectional view of a generator constructed in accordance with the principles of my invention; Fig. 2 is a fragmentary view similar to Fig. 1 showing an alternative form of construction of a portion of such machine; Fig. 3 is a wiring diagram of a welding circuit including the type of generator construction illustrated in Fig. 1; Fig. 4 is a wiring diagram of a welding circuit including a generator constructed according to the modification illustrated in Fig. 2; and Figs. 5 and 6 are wiring diagrams of welding circuits illustrating further modifications in the construction of the welding current generator.

Referring now more specifically to the drawing and more especially to Figs. 1 and 2, it will be noted that the welding current generator generally indicated at 1 consists of the usual frame 2 and poles 3 and 4. Poles 3 and 4 of the machine have arranged thereon windings in the manner hereinafter more fully explained.

The exciting means for the welding current generator 1 as most clearly illustrated in Fig. 4 may include an exciting winding 5 connected to a separate source of supply or to the armature 6 of the generator. The winding 5 may have a variable resistance 7 in series therewith so that the intensity or strength of such field may be varied. In order that there may be adjustments for stable ranges of automatic regulation of the arcing circuit from a given no-load voltage, I provide a bucking series field 8 which is in series with the arc 9, which will be maintained between a suitable electrode and the work to which the same is presented in arcing relation. The strength of the field 8 may be varied by the employment preferably of an adjustable inductive shunt 10. It will be noted that while a non-inductive variable resistance might be employed as a shunt around the field 8 for the purpose of varying the strength thereof, nevertheless, the inductive shunt is preferable due to the fact that such shunt, acting as a choke coil when surges of current occur in the welding circuit, increases the efficiency of the series field 8 for the purpose for which the same is employed.

In order that the series field 8 may be employed as a stabilizing reactance in the welding circuit which requires that such field, or at least a portion thereof, be in series with the welding circuit at all times and further, to reduce the bucking effect of such field so as to realize the full effect of the exciter field 5 when desired, I enclose such field 8, as is most clearly illustrated in Fig. 2, in a magnetic shunt 11, which is preferably connected to the frame of the machine. By the employment of this magnetic shunt, I am enabled to have the bucking field 8 carry sufficient current throughout the entire operation of the arc so that such field acts as the necessary stabilizing inductance which enables me to omit the usual separate stabilizer in series with the arc.

An interpole winding 12 is also in series with the arc and the reactance of this interpole winding may advantageously be employed to supplement the reactance in the series field 8 to afford the proper stabilizing effect on the welding circuit.

Instead of enclosing the entire series field 8 within the magnetic shunt 11, as illustrated in Fig. 2, I may prefer to separate such field into two or more parts 13 and 14, as is most clearly illustrated in Figs. 1 and 3 and place the magnetic shunt 11 around only that portion 13 of the windings which is at all times in series with the welding arc and which acts as the stabilizing reactance in the circuit. When the bucking series field or fields are divided into sections, as illustrated in Figs. 1 and 3, the proper control of the output of the welding current generator may be had by varying the strength of the bucking field 14 by cutting out windings thereof, step by step, or other means for varying this field may be employed such as are hereinafter more fully explained.

These other methods for varying the strength of the bucking field 14 are illustrated in Figs. 5 and 6 as respectively consisting either of a variable resistance shunt 15 or a variable inductance shunt 16.

In order to reduce to a minimum the transients set up by fluctuations in the welding current, I propose to arrange the series fields and the exciter fields 5 on separate poles of the machine, as is most clearly illustrated in Fig. 1. This arrangement reduces to a minimum the E. M. F. which will be induced in the field 5 upon variations in the welding circuit which will affect the current flowing in the series fields.

It is believed that the further advantages resulting from the employment of the principles comprising my invention in the construction of welding current generators will be so evident to those familiar with the art that a detailed enumeration thereof is unnecessary.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. The combination with a welding circuit, and a generator for supplying current thereto, of exciting means for said generator comprising an exciting winding and a bucking winding in series with the welding circuit, a magnetic shunt around a portion of said series winding, and a current shunt around another portion of said series winding.

2. The combination with a welding circuit, and a generator for supplying current thereto, of exciting means for said generator comprising an exciting winding and a bucking winding in series with the welding circuit, a magnetic shunt around a portion of said series winding, and means for varying the remainder of said series winding.

3. The combination with a welding circuit, and a generator for supplying current thereto, of exciting means for said generator comprising an exciting winding and a bucking winding in series with the welding circuit, a magnetic shunt around a portion of said series winding, and a variable resistance shunt around another portion of said series winding.

4. The combination with a welding circuit, and a generator for supplying current thereto, of exciting means for said generator comprising an exciting winding and a bucking winding in series with the welding circuit, a magnetic shunt around a portion of said series winding, and an induction shunt around another portion of said series winding.

5. The combination with a welding circuit, and a generator for supplying current thereto, of exciting means for said generator comprising an exciting winding and a bucking winding in series with the welding circuit, a magnetic shunt around a portion of said series winding, and a variable inductive shunt around another portion of said series winding.

6. The combination with a welding circuit, and a generator for supplying current thereto, of exciting means for said generator comprising an exciting winding, a bucking adjustable winding in series with the welding circuit, and a magnetic shunt around said series winding, said series and exciting windings arranged on separate poles of the generator.

GEORGE G. LANDIS.